United States Patent
Spernoga

(10) Patent No.: US 10,040,471 B2
(45) Date of Patent: Aug. 7, 2018

(54) BABY STROLLER PILLOW

(71) Applicant: Penny Vestal Spernoga, Lewisville, NC (US)

(72) Inventor: Penny Vestal Spernoga, Lewisville, NC (US)

(*) Notice: Subject to any disclaimer, the term of this patent is extended or adjusted under 35 U.S.C. 154(b) by 0 days.

(21) Appl. No.: 15/161,494

(22) Filed: May 23, 2016

(65) Prior Publication Data
US 2017/0029005 A1  Feb. 2, 2017

Related U.S. Application Data

(60) Provisional application No. 62/282,159, filed on Jul. 28, 2015.

(51) Int. Cl.
*B62B 9/10* (2006.01)

(52) U.S. Cl.
CPC ................. *B62B 9/106* (2013.01)

(58) Field of Classification Search
CPC ...................................... B62B 9/106
USPC ................................... 297/219.12
See application file for complete search history.

(56) References Cited

U.S. PATENT DOCUMENTS

| | | | |
|---|---|---|---|
| 4,885,811 A | 12/1989 | Hayes | |
| 4,979,520 A | 12/1990 | Boone, Jr. et al. | |
| 5,056,533 A | 10/1991 | Solano | |
| 6,017,094 A | 1/2000 | Syiek | |
| 7,062,807 B2 | 6/2006 | Conforti | |
| 7,591,029 B2 | 9/2009 | Weedling et al. | |
| 7,761,944 B2 | 7/2010 | Skophammer | |
| 8,495,775 B2 * | 7/2013 | Fair | A47D 13/083 5/652 X |
| 9,462,902 B1 * | 10/2016 | Rukel | A47G 9/10 |

FOREIGN PATENT DOCUMENTS

CN         2354454 Y     12/1999

* cited by examiner

*Primary Examiner* — Anthony D Barfield
(74) *Attorney, Agent, or Firm* — Joseph C. Merek

(57) ABSTRACT

A system for selective coupling a pillow with a stroller is provided. The system includes the stroller and the pillow. The pillow includes a surface defining a cavity therewithin, the cavity including filler. The pillow further includes a pair of stroller engaging straps extending from the surface for selectively coupling the pillow to the stroller, wherein, when the pillow is selectively coupled to the stroller, the surface of the pillow is positioned for allowing a child's head to rest thereon.

20 Claims, 3 Drawing Sheets

BABY STROLLER PILLOW

CROSS-REFERENCE TO RELATED APPLICATIONS

This application is a non-provisional claiming the benefit of U.S. Provisional Application 62/282,159 filed Jul. 28, 2015, which is hereby incorporated by reference in its entirety.

TECHNICAL FIELD

The presently disclosed subject matter is directed towards a pillow for selective coupling to a stroller. Specifically, when the pillow is selectively coupled to the stroller, a surface of the pillow is positioned for allowing a child's head to rest thereon.

BACKGROUND

Strollers for children and babies are ubiquitous, providing an ease of transport for busy and mobile guardians, while simultaneously providing protection and comfort to the child being transported. Efforts to provide enhanced comfort and customized amenities to the child have had limited success. Often children attempting to rest or sleep in the strollers have trouble finding a comfortable resting position. Additionally, toys, food and drink containers, and other items will remain unsecured to the stroller, leaving open the possibility for loss and damage to these items.

Accordingly, there remains a need for a system or pillow that addresses the various disadvantages associated with previous strollers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a system for selective coupling a pillow with a stroller is provided. The system includes the stroller and the pillow. The pillow includes a surface defining a cavity therewithin, the cavity including filler. The pillow further includes a pair of stroller engaging straps extending from the surface for selectively coupling the pillow to the stroller, wherein, when the pillow is selectively coupled to the stroller, the surface of the pillow is positioned for allowing a child's head to rest thereon.

According to at least one embodiment of the disclosed subject matter, a pillow for selective coupling with a stroller is provided. The pillow includes a surface defining a cavity therewithin, the cavity including filler. The pillow further includes a pair of stroller engaging straps extending from the surface for selectively coupling the pillow to the stroller, wherein, when the pillow is selectively coupled to the stroller, the surface of the pillow is positioned for allowing a child's head to rest thereon.

According to another embodiment of the disclosed subject matter, the system or pillow further includes a liner within the cavity for housing the filler.

According to another embodiment of the disclosed subject matter, the surface includes a zipper thereon for removing the liner from within the surface.

According to another embodiment of the disclosed subject matter, the surface consists essentially of washable material.

According to another embodiment of the disclosed subject matter, the surface includes a top surface for allowing the child's head to rest thereon and a bottom surface coupled to the pair of stroller engaging straps.

According to another embodiment of the disclosed subject matter, the top surface includes a first material and the bottom surface comprises a second material, the first material being distinct from the second material.

According to another embodiment of the disclosed subject matter, the system or pillow further includes at least one accessory engaging loop extends from the surface for engaging at least one accessory to the pillow.

According to another embodiment of the disclosed subject matter, the stroller engaging straps are each selectively coupled about a tray of the stroller.

According to another embodiment of the disclosed subject matter, each of the stroller engaging straps includes a female fastener on one end and a male fastener on another end for selectively coupling the ends of the stroller engaging straps about the stroller.

According to another embodiment of the disclosed subject matter, the pair of stroller engaging straps selectively couple to each other and the pillow further comprises a second pair of stroller engaging straps capable of selectively couple to each other.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

DETAILED DESCRIPTION

Figure 1:
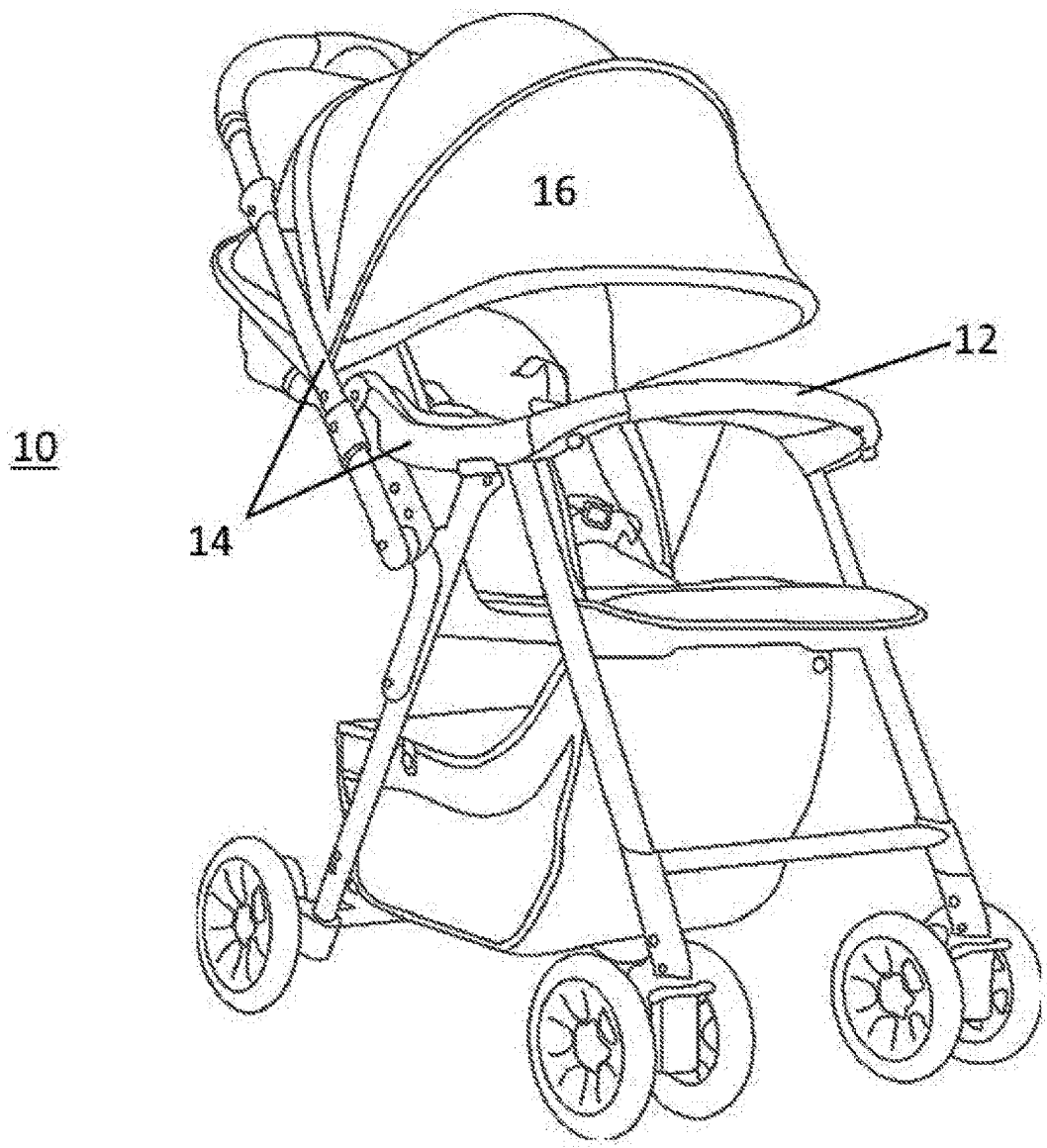
FIG. 1 is a perspective view of a stroller of the system according to one or more embodiments of the presently disclosed subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes.

Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

As shown in FIG. 1, a stroller 10 is provided according to one or more embodiments. The stroller may include a tray 12, side support arms 14 and/or an overhang 16. The stroller 10 may be configured to transport one, two or more children—the stroller having a single large tray or multiple trays 12, two or more support arms 14 and/or multiple overhangs 16. Strollers 10 are well known and a preferred mode of transport for mobile guardians transporting their children. The tray 12 is often configured with a general elongated recess for accepting items therein and a cup recess for accepting a beverage container. Unfortunately, these recesses rarely ensure that the items or beverage containers placed thereon remain stationed on the tray 12; instead, either through regular motion or by the actions of a child, the items or containers fall to the ground and are lost or damaged.

Figure 2:
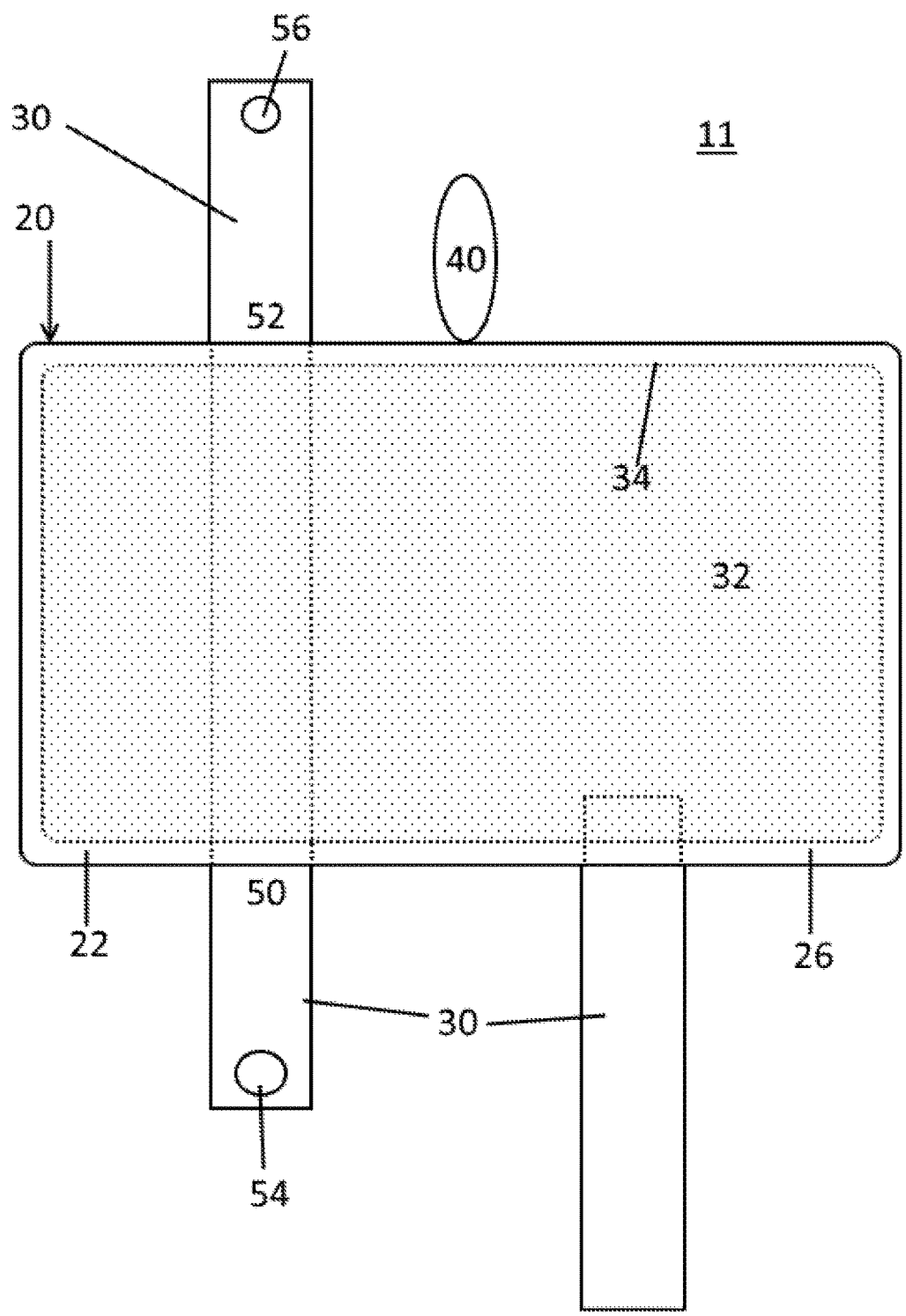
FIG. 2 is a top view of a pillow according to one or more embodiments of the presently disclosed subject matter.
Figure 3:
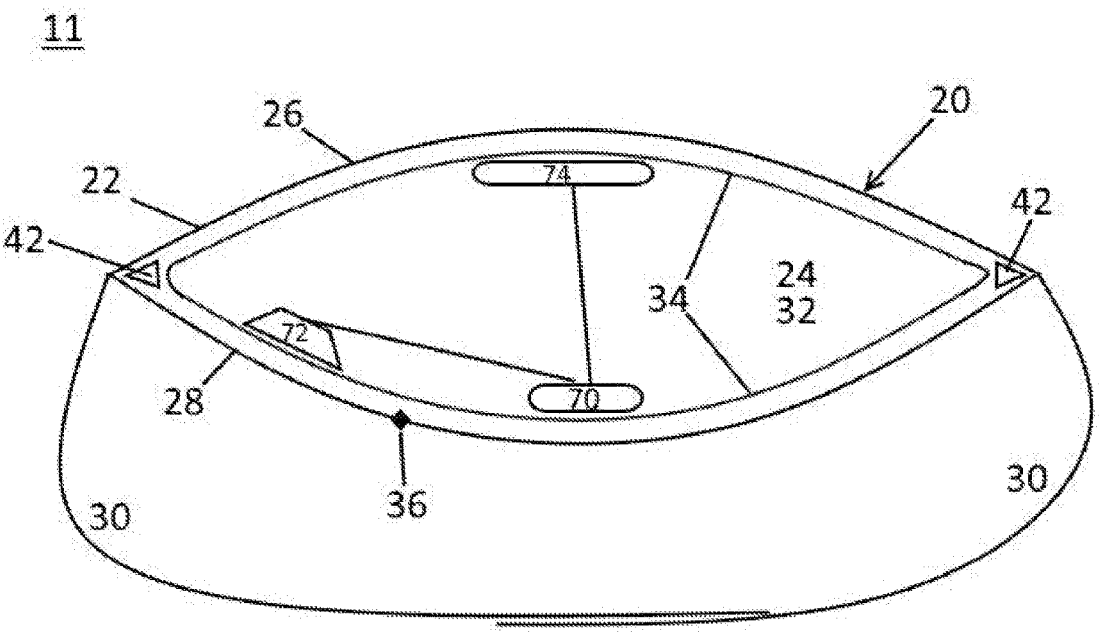
FIG. 3 is a cross-sectional view of the pillow according to one or more embodiments of the presently disclosed subject matter.

Further, during transport or while at rest, a child will often become weary and look to rest their head. Turning to FIGS. 2 and 3, a pillow 20 for accepting a child's head is provided according to one or more embodiments. The system 11 disclosed herein may include the stroller 10 for selective coupling with the pillow 20, or, alternatively, the pillow 20 may be provided independent of a stroller 10. The pillow may include a surface 22 defining a cavity 24 therewithin. The surface 22 may be any number of shapes and sizes, including, but not limited to, rectangular-shaped, ellipsoid-shaped, round, animal-shaped, cloud-shaped and character-shaped. The surface 22 may include any number of sides or sub-surfaces. For example, the surface may include a top surface 26 for allowing the child's head to rest thereon and a bottom surface 28 opposite the top surface 26.

The surface 22 may be comprised of any number of materials. In at least one embodiment, the top surface 26 includes a first material and the bottom surface 28 comprises a second material, the first material being distinct from the second material. In another embodiment, the top surface 26 and the bottom surface 28 comprise the same materials. The materials may comprise or consist essentially of washable materials, waterproof materials, stain protection materials and/or textured materials.

The bottom surface 28 may rest upon the tray 12 or the side support arms 14 of the stroller 10. Further, the bottom surface 28 may be coupled or selectively engaged to a pair of stroller engaging straps 30. The pair of stroller engaging straps 30 may extend from the surface 22 for selectively coupling the pillow 20 to the stroller 10. The surface 22 of the pillow 20 may be positioned for allowing a child's head, or any other portion of the child, to rest thereon. In another embodiment, the pair of stroller engaging straps 30 may be selectively coupled to the overhang 16 for suspending the pillow 20, which may be suspend above a tray 12 or resting on the tray 12. The pillow 20 may be positioned to tilt towards or away from the child for increased comfort during rest.

In some embodiments, the cavity 24 may include filler 32. The filler 32 may include or consist essentially of any one or more of the following: air, fibers, down feathers, polyester fibers, silk fibers, curled polyester fibers, scraps of polyester batting, foam or shredded foam, memory foam or shredded memory foam, latex, cotton, kapok, wool, beads or bean bag fill. The cavity 24 may include a liner 34 for housing the filler 32. Further, the surface 22 may include a zipper 36 thereon for removing the liner 34 from within the surface 22. Removing the liner 34 from within the surface 22 allows the interchange of liners 34 and/or permits the surface 22 to be washed when the surface consists essentially of washable material.

The pillow 20 may further include one or more support bar 42 housed within the cavity 24 for maintaining a pillow shape. For example, the pillow 20 may include two support bars 42 positioned proximal to edges where the top surface 26 and bottom surface 28 engage for maintaining an arcuate shape (e.g., a partial moon shape). Alternatively, the one or more support bars 42 may maintain a substantially straight pillow shape, which may be useful when suspending the pillow 20 from the overhang 16 or when selectively coupling the pillow 20 to a side support arm 14. In some embodiments, the support bar(s) 42 may maintain a shape to fit the child's head.

According to some embodiments, the pillow 20 may further include at least one accessory engaging loop 40 extending from the surface 22 for engaging at least one accessory to the pillow 20. In some embodiments, the pillow 20 may include two or more accessory engaging loops 40. The accessory engaging loops 40 may be positioned proximal to each other or on opposite sides of the pillow 40. The loops 40 may extend from the top surface 26, the bottom surface 28 or each loop 40 may extend from either the top surface 26 or the bottom surface 28.

As described supra, the pillow 20 may be selectively coupled to the stroller 10 using the pair of stroller engaging straps 30. Each of the stroller engaging straps 30 may be engaged with the bottom surface 28 and define a first end 50 extending from the pillow 20 in one direction and a second end 52 extending from the pillow 20 in an opposite direction. FIG. 2 illustrates a strap 30 extending from both sides of the pillow 20 (on the left) and a strap extending from one side of the pillow 20 and selectively engageable with the opposite side of the pillow (on the right, fasteners not shown) or the strap 30 extending across the bottom surface 28 of the pillow 20 (not shown). The first end 50 may include a fastener 54, male or female, and the second end 52 may include another corresponding fastener 56, female or male, for selectively coupling the ends 50, 52 of the strap 30 together. The strap(s) 30 may be selectively coupled about a tray 12, side support arms 14 and/or an overhang 16 for positioning the pillow 20 with respect to the stroller 10 and the child. In one embodiment, for example, the pair of stroller engaging straps 30 includes a female fastener on one end and a male fastener on another end for selectively couple the ends of each of the stroller engaging straps 30 about the stroller 10.

In some embodiments, the pillow 20 includes two pairs of stroller engaging straps 30. A first pair of stroller engaging straps 30 may each extend from the pillow 20 in opposite directions, with the first strap 30 of the first pair including a fastener 54, male or female, and the second strap 30 of the first pair including a corresponding fastener 56, female or male. In such an embodiment, the first pair of straps 30 selectively couple about the stroller 10 and fasten to each other, and the second pair of straps 30 selectively couple about the stroller 10 in another position and fasten to each other. The fasteners 54, 56 may include hook and loop fasteners, buttons, quick-lock and release mechanisms, ladder locks, couplers, clips, and/or buckles.

In some embodiments, the pillow 20 may further include a power source 70 for powering a speaker 72 and/or vibratory device 74 for soothing the child. The speaker 72 and/or vibratory device 74 may be accessible through the zipper 36 for selecting or adding music or for changing vibratory settings.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A system for selectively coupling a pillow with a stroller comprising: the stroller; and
   the pillow including:
   a surface defining a cavity therewithin, the cavity including filler;
   first and second stroller engaging straps extending from the surface for selectively coupling the pillow to the stroller,
   wherein, when the pillow is selectively coupled to the stroller, the surface of the pillow is positioned for allowing a child's head to rest thereon;
   a top edge and a bottom edge, said bottom edge spaced from and opposite said top edge; a first side edge and a second side edge, said second side edge spaced from and opposite side first side edge, said first and second side edges joining said top and said bottom edges defining a periphery of said pillow, a first support bar support bar disposed along said first side edge, a second support bar disposed along said second side edge, said first and second support bars being housed within said cavity for maintaining a shape of said pillow; and
   a liner within the cavity for housing the filler, wherein the surface includes a zipper thereon for removing the liner from within the surface.

2. The system of claim 1, wherein the surface consists essentially of washable material.

3. The system of claim 1, wherein the surface includes a top surface for allowing the child's head to rest thereon and a bottom surface coupled to the pair of stroller engaging straps.

4. The system of claim 3, wherein the top surface includes a first material and the bottom surface comprises a second material, the first material being distinct from the second material.

5. The system of claim 1, further comprising at least one accessory engaging loop extends from the surface for engaging at least one accessory to the pillow.

6. The system of claim 1, wherein the stroller engaging straps are each selectively coupled about a tray of the stroller.

7. The system of claim 1, wherein each of the stroller engaging straps includes a female fastener on one end and a male fastener on another end for selectively coupling the ends of the stroller engaging straps about the stroller.

8. The system of claim 1, wherein the pair of stroller engaging straps selectively couple to each other and the pillow further comprises a second pair of stroller engaging straps capable of selectively couple to each other.

9. The pillow of claim 1, wherein said first and second stroller engaging straps extend transverse with respect to said support bars.

10. A pillow for selective coupling with a stroller comprising: a surface defining a cavity therewithin, the cavity including filler;
    first and second stroller engaging straps extending from the surface for selectively coupling the pillow to the stroller, said second strap being shorter than said first strap;
    wherein, when the pillow is selectively coupled to the stroller, the surface of the pillow is positioned for allowing a child's head to rest thereon;
    a top edge and a bottom edge, said bottom edge spaced from and opposite said top edge, a first side edge and a second side edge, said second side edge spaced from and opposite side first side edge, said first and second side edges joining said top and said bottom edges defining a periphery of said pillow, a first support bar support bar disposed along said first side edge, a second support bar disposed along said second side edge, said first and second support bars being housed within said cavity for maintaining a shape of said pillow: and
    a liner within the cavity for housing the filler, wherein the surface includes a zipper thereon for removing the liner from within the surface.

11. The pillow of claim 10, wherein the surface consists essentially of washable material.

12. The pillow of claim 10, wherein the surface includes a top surface for allowing the child's head to rest thereon and a bottom surface coupled to the pair of stroller engaging straps.

13. The pillow of claim 12, wherein the top surface includes a first material and the bottom surface comprises a second material, the first material being distinct from the second material.

14. The pillow of claim 10, further comprising at least one accessory engaging loop extends from the surface for engaging at least one accessory to the pillow.

15. The pillow of claim 10, wherein the stroller engaging straps are each selectively coupled about a tray of the stroller.

16. The pillow of claim 10, wherein each of the stroller engaging straps includes a female fastener on one end and a male fastener on another end for selectively coupling the ends of the stroller engaging straps about the stroller.

17. The pillow of claim 10, wherein the pair of stroller engaging straps selectively couple to each other and the pillow further comprises a second pair of stroller engaging straps capable of selectively couple to each other.

18. The pillow of claim 10, wherein said first and second stroller engaging straps extend transverse with respect to said support bars.

19. The pillow of claim 10, where said first strap extends over said first and second side edges, and said second strap extends over only said first side edge.

20. The pillow of claim 10, where a power source is disposed in said opening intermediate said first and said second support bars.

* * * * *